United States Patent [19]

Story et al.

[11] Patent Number: 5,822,548
[45] Date of Patent: Oct. 13, 1998

[54] PROGRAMMING INTERFACE FOR A UNIVERSAL ASYNCHRONOUS RECEIVER/ TRANSMITTER

[75] Inventors: Franklyn H. Story, Chandler; Scott E. Harrow, Scottsdale, both of Ariz.; Laura E. Simmons, Salem, Oreg.

[73] Assignee: VLSI Technology, Inc., San Jose, Calif.

[21] Appl. No.: 586,040

[22] Filed: Jan. 16, 1996

[51] Int. Cl.⁶ .................................................. H01J 13/00
[52] U.S. Cl. ...................... 395/286; 395/309; 395/310; 395/883; 395/892; 395/285
[58] Field of Search .................................. 395/285, 286, 395/282, 283, 500, 527, 800, 652, 653, 309, 310, 311, 822, 826, 858, 857, 882, 883, 884, 892

[56] References Cited

U.S. PATENT DOCUMENTS

| | | | |
|---|---|---|---|
| 5,140,679 | 8/1992 | Michael | 395/286 |
| 5,371,736 | 12/1994 | Evan | 370/83 |
| 5,537,646 | 7/1996 | Buck et al. | 395/500 |
| 5,564,061 | 10/1996 | Davies et al. | 395/884 |
| 5,604,870 | 2/1997 | Moss et al. | 395/280 |
| 5,606,709 | 2/1997 | Yoshioka et al. | 395/800 |
| 5,610,601 | 3/1997 | Lahti et al. | 341/22 |
| 5,619,722 | 4/1997 | Lovrenich | 395/822 |

*Primary Examiner*—Ayaz R. Sheikh
*Assistant Examiner*—Raymond N. Phan
*Attorney, Agent, or Firm*—LaValle D. Ptak

[57] ABSTRACT

A universal asynchronous receiver/transmitter (UART) computer programming interface emulates three-wire interface control. A register select circuit is supplied with address signals from a host CPU and has a plurality of register outputs organized into first and second groups. One of these groups of outputs are those which are required for three-wire operation in communications devices; and these outputs are mapped to the appropriate communications devices or registers. The other group of outputs required for three-wire operation, but with no corresponding function in a communications device, are implemented by means of an UART emulator circuit producing a data output which is coupled to an internal data bus, along with the output of the registers for the communications devices.

9 Claims, 9 Drawing Sheets

FIG. 1

| LEGACY UART I/O DATA | | | UART MAP I/O DATA | |
|---|---|---|---|---|
| B7 | 7 | ↔ | 7 | 0 |
| B6 | 6 | ↔ | 6 | 0 |
| B5 | 5 | ↔ | 5 | 0 |
| B4 | 4 | ↔ | 4 | 0 |
| EDSSI | 3 | ↔ | 3 | 0 |
| ERLSI | 2 | ↔ | 2 | OE_EN |
| ETBEI | 1 | ↔ | 1 | TPKTEN |
| ERBFI | 0 | ↔ | 0 | RPKTEN |

FIG. 4A

INTERRUPT ENABLE REGISTER-IER (R/W)

| UART REG. 01h | D7 | D6 | D5 | D4 | D3 | D2 | D1 | D0 |
|---|---|---|---|---|---|---|---|---|
| | 0 | 0 | 0 | 0 | EDSSI | ERLSI | ETBEI | ERBFI |
| POR VALUE | 0 | 0 | 0 | 0 | 0 | OE_EN | TPKTEN | RPKTEN |

| BIT | NAME | FUNCTION |
|---|---|---|
| 7:4 | 0 | THIS BIT ALWAYS RETURNS ZERO. |
| 3 | EDSSI | ENABLE MODEM STATUS INTERRUPT. THIS BIT IS RO AND ALWAYS RETURNS ZERO. |
| 2 | ERLSI | ENABLE RECEIVER LINE STATUS INTERRUPT. ACCESSES TO THIS BIT ARE DIRECTED TO OE_EN. |
| 1 | ETBEI | ENABLE TRANSMIT BUFFER REGISTER EMPTY INTERRUPT. ACCESSES TO THIS BIT ARE DIRECTED TO TPKTEN. |
| 0 | ERBFI | ENABLE RECEIVED BUFFER FULL INTERRUPT. ACCESSES TO THIS BIT ARE DIRECTED TO RPKTEN. |

READ BUFFER REGISTER-RBR (R-O)

| I/R REG 00h | D7 | D6 | D5 | D4 | D3 | D2 | D1 | D0 |
|---|---|---|---|---|---|---|---|---|
| | \multicolumn{8}{c}{RDATA} |
| POR VALUE | 0 | 0 | 0 | 0 | 0 | 0 | 0 | 0 |

| BIT | NAME | FUNCTION |
|---|---|---|
| 7:0 | RDATA | READ DATA. ACCESSES TO THIS REGISTER ARE DIRECTED TO THE FIFO. |

LINE CONTROL REGISTER-LCR (R/W)

| UART REG 03h | D7 | D6 | D5 | D4 | D3 | D2 | D1 | D0 |
|---|---|---|---|---|---|---|---|---|
| | DLAB | BREAK | STKPAR | EPS | PEN | STB | WLS | |
| POR VALUE | 0 | 0 | 0 | 0 | 0 | 0 | 1 | 1 |

| BIT | NAME | FUNCTION |
|---|---|---|
| 7 | DLAB | DIVISOR LATCH ACCESS BIT. WHEN THIS BIT IS A ZERO, THE RECEIVER BUFFER, TRANSMIT HOLDING AND INTERRUPT ENABLE REGISTERS ARE ACCESSABLE. WHEN THIS BIT IS A ONE, THEY ARE REPLACED BY THE DIVISOR LATCH REGISTERS. |
| 6 | BREAK | BREAK CONTROL. THIS BIT IS RO AND ALWAYS RETURNS ZERO. |
| 5 | STKPAR | STICK PARITY. THIS BIT IS RO AND ALWAYS RETURNS TO ZERO. |
| 4 | EPS | EVEN PARITY SELECT. THIS BIT IS RO AND ALWAYS RETURNS ZERO. |
| 3 | PEN | PARITY ENABLE. THIS BIT IS RO AND ALWAYS RETURNS ZERO. |
| 2 | STB | STOP BIT SELECT. THE SIR LINK USES A FIXED SINGLE STOP BIT. THIS BIT IS RO AND ALWAYS RETURNS ZERO. |
| 1:0 | WLS | WORD LENGTH SELECT. THE SIR LINK USES A FIXED 8-BIT WORD LENGTH. THESE BITS ARE RO AND ALWAYS RETURN 11b. |

TRANSMIT HOLDING REGISTER-THR (W-O)

| I/R REG | D7 | D6 | D5 | D4 | D3 | D2 | D1 | D0 |
|---|---|---|---|---|---|---|---|---|
| 00h | \multicolumn{8}{c} WDATA |
| POR VALUE | 0 | 0 | 0 | 0 | 0 | 0 | 0 | 0 |

| BIT | NAME | FUNCTION |
|---|---|---|
| 7:0 | WDATA | WRITE DATA. ACCESSES TO THIS REGISTER ARE DIRECTED TO THE FIFO. |

DIVISOR LATCH MSB-DLM(R-O)

| UART REG | D7 | D6 | D5 | D4 | D3 | D2 | D1 | D0 |
|---|---|---|---|---|---|---|---|---|
| 01h | R | R | R | R | R | R | R | R |
| POR VALUE | 0 | 0 | 0 | 0 | 0 | 0 | 0 | 0 |

| BIT | NAME | FUNCTION |
|---|---|---|
| 7:0 | R | RESERVED. THESE BITS ALWAYS RETURNS ZERO. |

INTERRUPT ID REGISTER-IIR (R-O)

| UART REG 02h | D7 | D6 | D5 | D4 | D3 | D2 | D1 | D0 |
|---|---|---|---|---|---|---|---|---|
| | FIFOEN | FIFOEN | 0 | 0 | FIFTO | IID | | INT# |
| POR VALUE | 1 | 1 | 0 | 0 | 0 | 0 | 0 | 1 |

| BIT | NAME | FUNCTION |
|---|---|---|
| 7:6 | FIFOEN | INDICATES THAT THE FIFO ARE ENABLED. THESE BITS ALWAYS RETURN ONE. |
| 5:4 | 0 | THIS BIT ALWAYS RETURNS ZERO. |
| 3 | FIFTO | FIFO TIMEOUT. THIS BIT IS ASSERTED ONLY WHEN THE INTERRUPT ID IS 10b (RECEIVE DATA AVAILABLE) AND THE FIFO TRIGGER LEVEL CHANGE HAS OCCURED. IN THIS IMPLEMENTATION, THIS CONDITION WILL EXIST AND THE INTERRUPT GENERATED WHEN THERE IS AT LEAST ONE BYTE IN THE FIFO AND FOUR CHARACTER TIMES (FORTY BIT TIMES) HAVE ELAPSED SINCE THE LAST TIME THE FIFO WAS READ BY THE CPU OR WRITTEN TO FROM THE SHIFT REGISTER. |
| 2:1 | IID | INTERRUPT ID. THIS FIELD INDICATES THE ID OF THE CURRENT INTERRUPT. IF THERE IS MORE THAN ONE INTERRUPT SOURCE ACTIVE, THE HIGHEST PRIORITY ID WILL BE INDICATED, WHERE 11b IS THE HIGHEST PRIORITY AND 00b IS THE LOWEST. 00b: MODEM STATUS. THIS ID WILL NEVER OCCUR. 01b: TRANSMIT HOLDING REGISTER EMPTY. THIS IS CAUSED BY (TPKTEN AND TPKTINT) ASSERTED. 10b: RECEIVED DATA AVAILABLE. THIS IS CAUSED BY (RPKTEN AND RPKTINT) ASSERTED. 11b: RECEIVER LINE STATUS. THIS IS CAUSED BY (OE_EN AND OE_INT) ASSERTED. |
| 0 | INT# | INTERRUPT PENDING. THIS BIT IS THE INVERSION OF ((RPKTEN AND RPKTINT) OR (TPKTEN AND TPKTINT) OR (OE_EN AND OE_INT)). |

FIFO CONTROL REGISTER - FCR (W-O)

| I/R REG | D7 | D6 | D5 | D4 | D3 | D2 | D1 | D0 |
|---|---|---|---|---|---|---|---|---|
| | RTRIG | | R | R | DMA-MODE | TRST | RRST | ENFIFO |
| POR VALUE | 0 | 0 | 0 | 0 | 0 | 0 | 0 | 1 |

| BIT | NAME | FUNCTION |
|---|---|---|
| 7:6 | RTRIG | RECEIVE FIFO TRIGGER LEVEL THESE BITS SET THE LEVEL AT WITCH THE RECEIVE FIFO INTERRUPT IS GENERATED.<br>00b: 01 BYTES<br>01b: 04 BYTES<br>10b: 08 BYTES<br>11b: 14 BYTES |
| 5:4 | R | RESERVED. THIS BIT ALWAYS RETURNS ZERO. |
| 3 | DMAMODE | DMA MODE. THIS BIT IS RO AND ALWAYS RETURNS ZERO. |
| 2 | TRST | TRANSMIT FIFO RESET. WHEN SET TO ONE, THIS BIT CLEARS ALL BYTES FROM THE TRANSMIT FIFO, I.E., IT RESETS THE COUNTER. THE RECEIVE SHIFT REGISTER IS NOT AFFECTED. |
| 1 | RRST | RECEIVE FIFO RESET. WHEN SET TO ONE, THIS BIT CLEARS ALL BYTES FROM THE RECEIVE FIFO, I.E., IT RESETS THE COUNTER. THE RECEIVE SHIFT REGISTER IS NOT AFFECTED. |
| 0 | ENFIFO | ENABLE FIFO. ENABLES THE FIFOS. THIS BIT IS HARDWIRED TO A ONE. |

MODEM CONTROL REGISTER-MCR (R/W)

| I/R REG | D7 | D6 | D5 | D4 | D3 | D2 | D1 | D0 |
|---|---|---|---|---|---|---|---|---|
| 04h | 0 | 0 | 0 | LOOP | OUT2 | OUT1 | RTS | DTR |
| POR VALUE | 0 | 0 | 0 | 0 | 0 | 0 | 0 | 0 |

| BIT | NAME | FUNCTION |
|---|---|---|
| 7:5 | 0 | THESE BITS ALWAYS RETURN ZERO. |
| 4 | LOOP | LOOP-BACK TEST SELECT. WHEN THIS BIT IS SET, THE SERIAL OUTPUT IS FORCED TO THE MARKING STATE AND THE SERIAL INPUT IS DISCONNECTED. THE OUTPUT OF THE TRANSMITTER SHIFT REGISTER IS LOOPED BACK INTO THE RECEIVER SHIFT REGISTER INPUT. IN LOOPBACK MODE, THE FOUR MODEM CONTROL OUTPUTS, RTS, DTR, OUT2 AND OUT1, ARE NORMALLY CONNECTED TO THE MODEM STATUS INPUTS, CTS, DSR, DCD AND RI, RESPECTIVELY. SINCE THE THREE-WIRE INTERFACE DOESN'T INCLUDE THE MODEM INTERFACE SIGNALS, THESE LOOP-BACK CONNECTIONS ARE NOT MADE AND THE MODEM STATUS INPUTS REMAIN READ-ONLY BITS. |
| 3 | OUT2 | OUT2 PIN CONTROL. WHEN THIS BIT IS SET, THE UART INTERRUPTS ARE ENABLED. THIS SIGNAL CORRESPONDS TO THE OUT2 PIN ON A 16C550 AND IS NOT EXTERNALLY CONNECTED, BUT IS INTERNALLY ANDED WITH THE INTERRUPT OUTPUTS OF THE UART EMULATOR. |
| 2 | OUT1 | OUT1 PIN CONTROL. THIS BIT IS RO AND ALWAYS RETURNS ZERO. |
| 1 | RTS | REQUEST TO SEND. THIS BIT IS RO AND ALWAYS RETURNS ZERO. |
| 0 | DTR | DATA TERMINAL READY. THIS BIT IS RO AND ALWAYS RETURNS ZERO. |

LINE STATUS REGISTER-LSR (R-O)

| I/R REG 05h | D7 | D6 | D5 | D4 | D3 | D2 | D1 | D0 |
|---|---|---|---|---|---|---|---|---|
|  | FIFERR | TEMT | THRE | BI | FE | PE | OE | DR |
| POR VALUE | 0 | 1 | 1 | 0 | 0 | 0 | 0 | 0 |

| BIT | NAME | FUNCTION |
|---|---|---|
| 7 | FIFERR | RECEIVE FIFO ERROR. THIS BIT INDICATES THAT AT LEAST ONE BYTE IN THE RECEIVE FIFO HAS AN ERROR. IT IS SET WHEN OE IS TRUE AND CLEARED WHEN OE IS FALSE. |
| 6 | TEMT | TRANSMITTER EMPTY. THIS BIT INDICATES THAT BOTH THE TRANSMIT FIFO AND TRANSMIT SHIFT REGISTER ARE EMPTY. |
| 5 | THRE | TRANSMIT HOLDING REGISTER EMPTY. THIS BIT REFLECTS THE STATE OF THE TRANSMIT FIFO AND IS A ONE WHENEVER THE FIFO IS EMPTY. |
| 4 | BI | BREAK INTERRUPT. THIS BIT IS RO AND ALWAYS RETURNS ZERO. |
| 3 | FE | RESERVED. THIS BIT ALWAYS RETURNS ZERO. |
| 2 | PE | PARITY ERROR. THIS BIT IS RO AND ALWAYS RETURNS ZERO. |
| 1 | OE | OVER-RUN ERROR. THIS BIT INDICATES THAT THE RECEIVE FIFO HAS AN OVER-RUN CONDITION. IT IS SET WHEN THE RECEIVER SHIFT REGISTER HAS A BYTE TO TRANSFER INTO THE FIFO AND THE FIFO IS FULL. IT IS CLEARED ON THE FIRST READ OF THE LSR, SINCE THE DATA IS NOT ACTUALLY TRANSFERRED FROM THE SHIFT REGISTER INTO THE FIFO AND THE CHARACTERS IN THE FIFO ARE NOT ALTERED. |
| 0 | DR | DATA READY. THIS BIT REFLECTS THE STATE OF THE RECEIVE FIFO AND IS A ONE WHENEVER THE FIFO IS NOT EMPTY. |

MODEM STATUS REGISTER - MSR (R-O)

| UART REG | D7 | D6 | D5 | D4 | D3 | D2 | D1 | D0 |
|---|---|---|---|---|---|---|---|---|
| 06h | DCD | RI | DSR | CTS | DDCD | TERI | DDSR | DCTS |
| POR VALUE | 0 | 0 | 1 | 1 | 0 | 0 | 0 | 0 |

| BIT | NAME | FUNCTION |
|---|---|---|
| 7 | DCD | DATA CARRIER DETECT. THIS ALWAYS RETURNS ZERO. |
| 6 | RI | RING INDICATOR. THIS BIT ALWAYS RETURNS ZERO. |
| 5 | DSR | DATA SET READY. THIS BIT ALWAYS RETURNS ONE. |
| 4 | CTS | CLEAR TO SEND. THIS BIT ALWAYS RETURNS ONE. |
| 3 | DDCD | DELTA DATA CARRIER DETECT. THIS BIT ALWAYS RETURNS ZERO. |
| 2 | TERI | TRAILING EDGE OF RING INDICATOR. THIS BIT ALWAYS RETURNS ZERO. |
| 1 | DDSR | DELTA DATA SET READY. THIS BIT ALWAYS RETURNS ZERO. |
| 0 | DCTS | DELTA CLEAR TO SEND. THIS BIT ALWAYS RETURNS ZERO. |

SCRATCHPAD REGISTER - SPR (R/W)

| UART REG | D7 | D6 | D5 | D4 | D3 | D2 | D1 | D0 |
|---|---|---|---|---|---|---|---|---|
| 07h | | | | SCRATCH | | | | |
| POR VALUE | 0 | 0 | 0 | 0 | 0 | 0 | 0 | 0 |

| BIT | NAME | FUNCTION |
|---|---|---|
| 7:0 | SCRATCH | SCRATCHPAD. THESE BITS ARE R/W BUT HAVE NO EFFECT ON THE SYSTEM. |

FIG. 11B

DIVISOR LATCH LSB-DLL (R/W)

FIG. 12A

| I/R REG | D7 | D6 | D5 | D4 | D3 | D2 | D1 | D0 |
|---|---|---|---|---|---|---|---|---|
| 00h | R | R | \multicolumn{6}{c|}{DIVISOR} | | | | | |
| POR VALUE | 0 | 0 | 0 | 0 | 0 | 0 | 0 | 0 |

| BIT | NAME | FUNCTION |
|---|---|---|
| 7 | R | RESERVED. THIS BIT ALWAYS RETURNS ZERO. |
| 6 | R | RESERVED. THIS BIT ALWAYS RETURNS ZERO. |
| 5:0 | DIVISOR | BAUD RATE DIVISOR. THE VALUE READ FROM THESE BITS IS THE VALUE FROM THE BAUDRATE FIELD OF THE I/R CONTROLLER PHYSICAL TIMING REGISTER. THE VALUE WRITTEN TO THESE BITS IS WRITTEN TO THE BAUDRATE FIELD OF THE SAME REGISTER. WHEN THIS REGISTER IS WRITTEN, IT CAUSES THE I/R CONTROLLER TO GENERATE A SERIAL BAUD RATE THAT IS DEPENDENT ON THE DIVISOR VALUE AS FOLLOWS (ALL VALUES SHOW IN DECIMAL).<br><br>DIVISOR    BAUDRATE<br>0<br>49-63<br>48    2400<br>13-47<br>12    9600<br>7-11<br>6    19200<br>4-5<br>3    38400<br>2    57600<br>1    115200 |

FIG. 12B

PROGRAMMING INTERFACE FOR A UNIVERSAL ASYNCHRONOUS RECEIVER/TRANSMITTER

BACKGROUND

In the personal computer business, there has been a rapid evolvement of the computers and computer interfaces over the years. Earlier personal computers (PCs), such as the IBM® PC/AT, employed an interface known as the RS232 interface, which was a full duplex, three-wire interface. The universal asynchronous receiver/transmitter programming interface for such computers used a controller block with direct mapped registers in it. Consequently, an address to the interface caused an output signal to be obtained on a lead, which then was supplied to the direct mapped registers.

At the present time, most Personal computers (PCs) use an infrared data association interface (IrDA), which is an interface with three-wire characteristics. The earlier PC/AT computers using the RS232 interfaces, however, still are in widespread use. As a consequence, when new communication interfaces and devices have been developed employing IrDA interfaces, the older PC-AT communication software has been leveraged to support the new hardware by adding layers of additional hardware around a UART block or software re-direction of attempts to provide input/output (I/O) access of a UART. This additional UART block hardware, or the requirement for I/O re-direction software, tends to be cumbersome and requires a variety of different solutions for the particular communication interfaces and devices developed. The result has been a requirement for customized UART systems or software solutions each time new communication interfaces are developed.

It is desirable to provide a hardware solution for emulating UART programming interfaces, which obviates the need for a UART block or I/O re-direction software.

SUMMARY OF THE INVENTION

The programming interface for a universal asynchronous receiver/transmitter which emulates the three-wire interface control includes a register select circuit responsive to address signals from a host CPU. The register select circuit has a plurality of register outputs which are organized into first and second groups. One of the groups of outputs is connected to an infrared input/output (IR I/O) controller register set, which has a data input/output. The second group of outputs from the register select circuit is connected to a UART emulator circuit, which also has a data input/output. A data bus is coupled with the data outputs of the IR I/O controller register set and the UART emulator circuit; so that the addresses which are supplied to the register select circuit are not required to distinguish the nature of the communications device which is accessed by the system.

DETAILED DESCRIPTION

Figure 1:
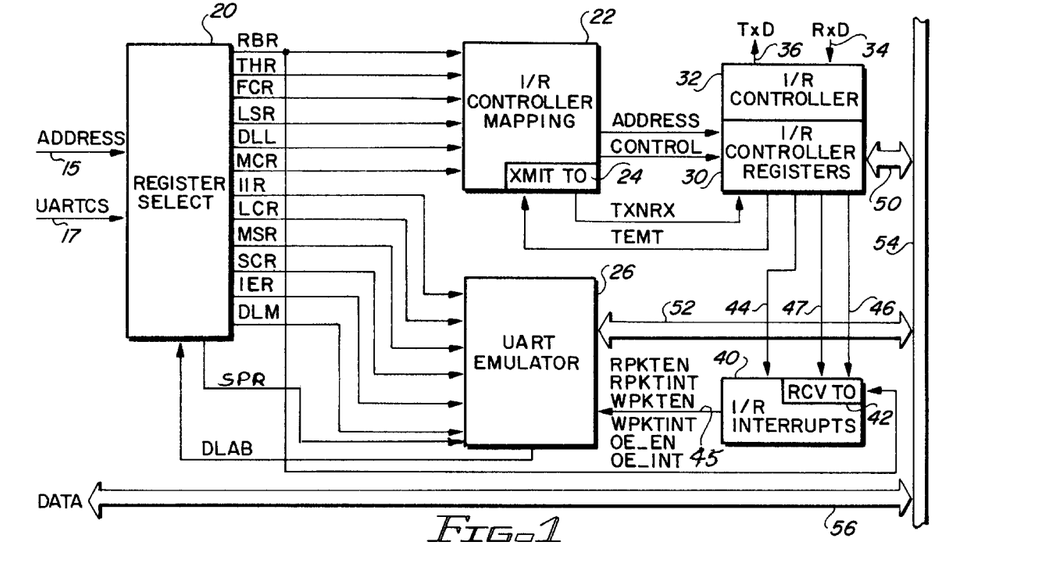
FIG. 1 is a block diagram of a system according to a preferred embodiment of the invention.

Reference now should be made to the drawings, in which the same reference numbers are used throughout the different figures to designate the same components. FIG. 1 is a block diagram of a universal asynchronous receiver/transmitter (UART) programming interface which may be utilized in conjunction with any three-wire interface control between a personal computer and various internal registers or communications devices.

As shown in FIG. 1, three-bit address signals from a host central processing unit (CPU) are applied over a bus 15 to a register select circuit 20. In addition, UART chip select (UARTCS) signals are applied over a bus 17 to the register select circuit 20. The circuit 20 is a decode circuit having a plurality of different outputs corresponding to different registers selected in accordance with the signals on the inputs 15 and 17 from the host CPU.

Three types of internal resisters are used in a serial channel in the system shown in FIG. 1. These are control, status and data registers. The control registers consist of bit rate select registers DLL (divisor latch LSB) and DLM (divisor latch MSB), line control register (LCR), interrupt enable register (IER), the modem control register (MCR), and the FIFO control register (FCR). The status registers are the line status register (LSR), interrupt ID register (IIR), and the modem status register (MSR). The data registers are the receiver buffer register (RBR), and the transmitter holding register (THR). These registers are commonly used in current personal computers (PCs); so that detailed descriptions of each of these registers and their functions are not provided here.

The UART register set is split into two groups, one of which is located within the infrared input/output (IR I/O) register set and contains bits which are directly related to SIR data control or status. The other group resides outside the IR I/O register set and contains bits which are directly related to UART register address mapping and interrupt control and status. The second group also contains registers that have hard-wired values.

Although the registers are separated into two groups in the system shown in FIG. 1, the accesses to each of the groups are indistinguishable from each other from the point of view of the interface at the address and chip select inputs 15 and 17 applied to the register select memory 20. The mapping of the various addresses selected by the circuit 20 and provided on the various outputs described above is illustrated in FIG. 1. For example, the receiver buffer register (RBR), the transmit holding register (THR), the FIFO control register (FCR), the modem control register (MCR), the line status register (LSR) and the divisor latch LSB (DLL) all are connected from the register select circuit 20 to the IR controller by way of the IR controller mapping circuit 22. This is the first group of registers.

The remainder of the registers, namely the interrupt enable resister (IER), the interrupt ID register (IIR), the line control register (LCR), the modem status register (MSR), the scratch register (SCR), and the divisor latch registers MSB (DLM) all are connected to the UART emulator block 26. This is the second group of registers. The registers of both groups all perform their standard functions; but from the CPU supplying the address signals and the chip select signals over the inputs 15 and 17, no distinction needs to be made. The distinction is made in the grouping of the outputs from the register select memory 20, as shown in FIG. 1.

The output of the I/R controller mapping circuit 22 is applied over address and control lines to I/R controller registers 30 and an I/R controller 32, which in turn produces the selected internal signals over a bus link 50 to an internal data bus 54/56, as shown in FIG. 1. Similarly, the addresses supplied to the UART emulator 26 result in data supplied over a bus link 52 to the internal data buses 54/56 of FIG. 1.

The I/R controller 32 is switched between transmit and receive modes by software control. The received data is received over a lead 34 and the transmit data is supplied over lead 36. This operation is half duplex operation; but the full duplex operation of PC-AT UART is emulated by automatically switching between transmit and receive modes.

In the full duplex PC-AT UART mode of operation, the transmit/receive mode is controlled by an internal transmit/ receive signal, which sets the I/R controller 32 into a receive mode when it is of one binary state and to a transmit mode when it is of the opposite binary state. The default mode is the receive mode. The system shown in FIG. 1 switches to the transmit mode whenever the THR register is written. This is automatically effected by the THR output from the register select circuit 20. The system switches back to the receive mode when the transmitter empty status (TEMT) is true for a timeout measured by a transmitter timeout circuit 24 in the I/R controller mapping circuit 22. This timeout period in the present system is selected to be equal to twenty serial bit times (two data bytes). At 2400 baud, this delay is 8.3 milliseconds, which is less than the 10 millisecond receiver recovery time of the I/R controller. At 115.2K baud, the delay will be 174 microseconds.

The receiver timeout 42 is provided in an I/R interrupt circuit 40. If the FIFO (first in first out) threshold is greater than one byte, the end of the packet of received data can occur before the FIFO threshold is reached, and no interrupt will be generated. To ensure reception of data at the end of a packet, a receive FIFO timeout interrupt is generated when the FIFO has no activity (in or out) for forty to fifty bit times (4 to 5 characters). This timeout period is selected to be compatible with delays inherent in older software (such as used with PC-AT computers). The transmit timeout is chosen for the relaxation time of conventional I/R photo detectors; so that as this relaxation time may be modified in the future, the transmit timeout can be adjusted accordingly.

Both the transmit timeout 24 and the receive timeout 42 are generated by counters (not shown) used to operate all of the various parts of the system shown in FIG. 1 and coordinated with the operation of the CPU supplying the signals on the inputs 15 and 17. The receive counter is reset by any edge of the SIR serial input applied over a lead 46 from the IR registers 30, or CPU accesses to the read buffer register RBR from select circuit 20. It should be noted that the timeout is enabled in the UART emulator 26 only when the receiver is enabled and the receive interrupt is inactive. The timeout condition is cleared by each read of the read buffer register via lead 47. It should be noted that a receive data available interrupt is generated whenever the receive timeout 42 occurs. The timeout condition is differentiated from a normal receive data interrupt by the FIFO timeout bit in the interrupt ID register (IIR).

The I/R controller 30/32 also produces three events which are enabled as interrupts to the host CPU via the internal control line 44. The receive FIFO interrupt (RXFIFOINT) event is signaled when the number of bytes in the receive FIFO is at or exceeds the programmed trigger level. The transmitter holding register empty (THRE) event also is signaled when the transmit FIFO is empty. A third event, the overrun error (OE) is signaled when the receive FIFO is full; and the receive shift register (not shown) becomes full. The three I/R controller events are latched in an interrupt register in the I/R interroupt block 40 with each of their enables. These six signals from the interrupt register then are sent over the bus 45 shown in FIG. 1, which supplies them to the UART interrupt encoder in the UART emulator block 26. The various interrupt signals from the I/R interrupt circuit 40 are identified on the output from the block 40 to the UART emulator 26.

Figure 2A:
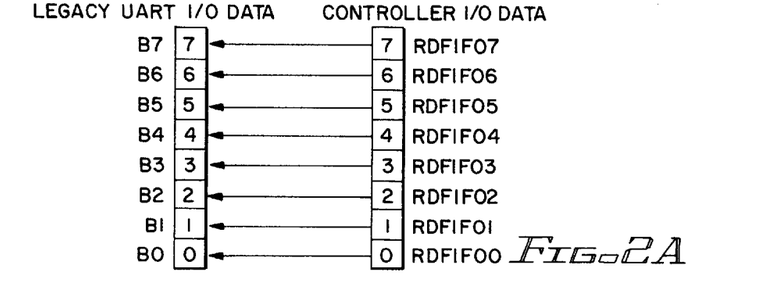
FIG. 2A shows read buffer register mapping.
Figure 2B:
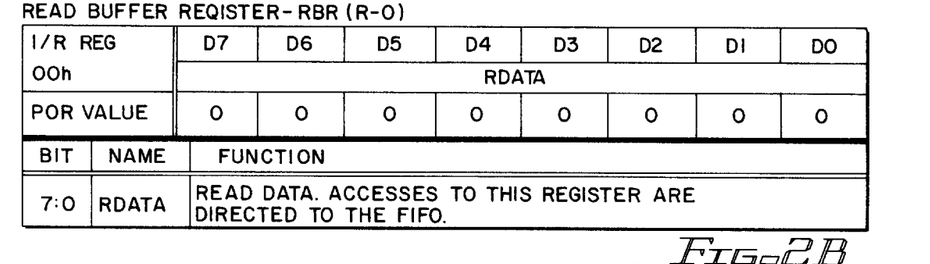
FIG. 2B shows the read buffer register.

Reference now should be made to FIGS. 2A and 2B. FIG. 2A illustrates the register mapping for the read buffer register (RBR). On the left side of the circuit shown in FIG. 2A is the actual host interface data bus for the data bus 54/56. On the right side (RDFIFO7:0) is the controller I/O data in the I/R data controller registers 30. FIG. 2B is the read buffer register for the eight data bits of FIG. 2A and indicates the function of this register.

Figure 3A:
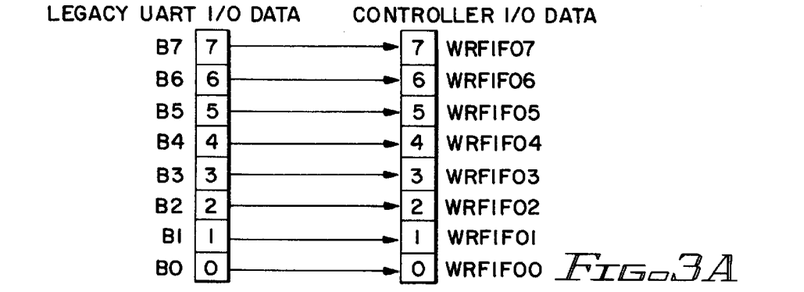
FIG. 3A illustrates transmit holding register mapping.
Figure 3B:
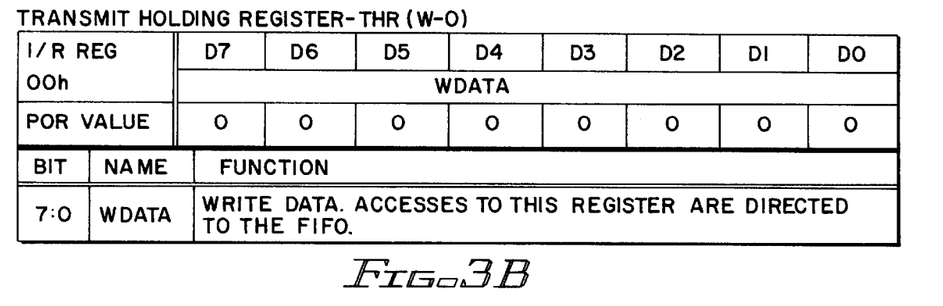
FIG. 3B is the transmit holding register.

FIGS. 3A and 3B show the transmit holding register (THR) mapping (FIG. 3A) and the actual transmit holding register (FIG. 3B) for data bits D7:0, along with the function of this register. Once again, the host interface data bus is shown on the left of FIG. 3A (D7:0), while the I/R controller register I/0 data (WRFIFO7:0) is shown on the right side of FIG. 3A. FIG. 3B diagrammatically shows the register and its function.

Figure 4A:
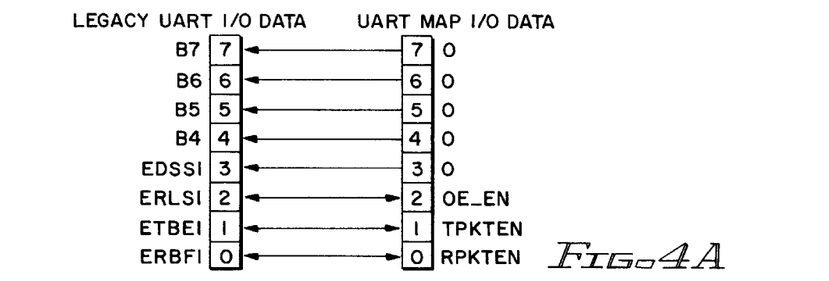
FIG. 4A shows interrupt enable register mapping.
Figure 4B:
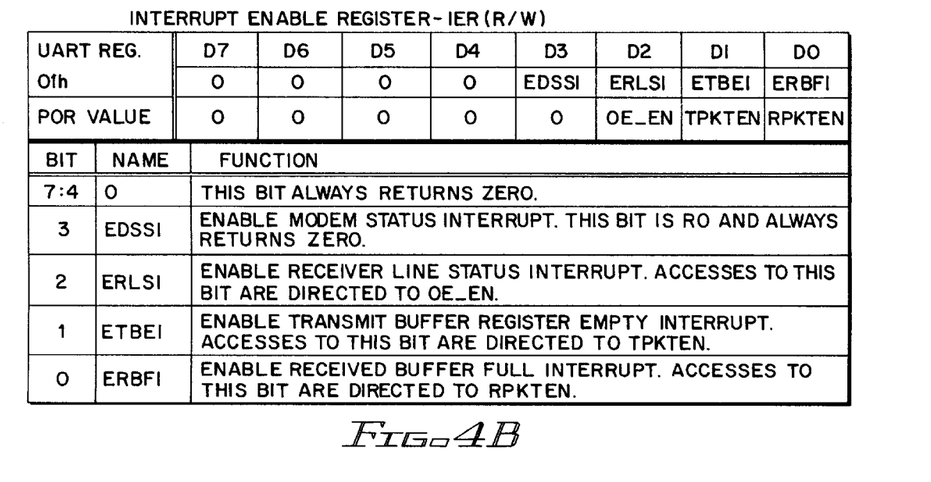
FIG. 4B is the interrupt enable register.

FIG. 4A illustrates the interrupt enable register mapping, showing on the left the actual host interface data bus 54/56 and on the right, the UART mapping I/O data of the UART emulator 26. FIG. 4B is the interrupt enable register; and the function of the various bits are illustrated in FIG. 4B. It should be noted that the I/R interrupts OE-EN, TPKTEN, and RPKTEN are illustrated in FIG. 4A and explained in FIG. 4B.

Figure 5A:
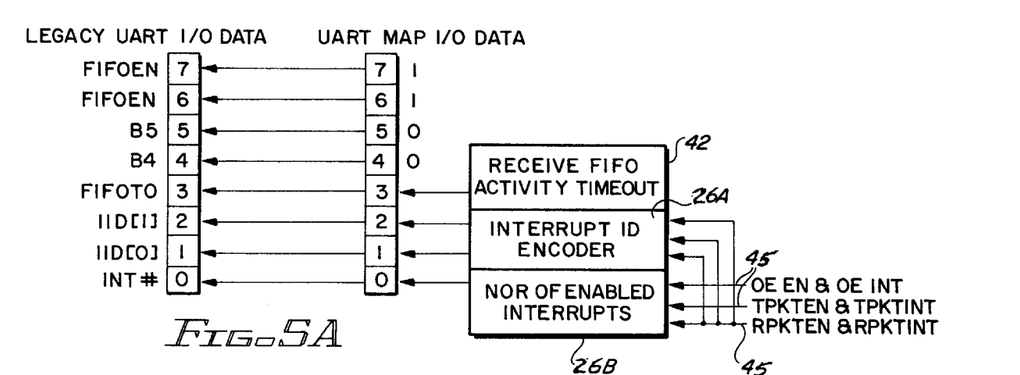
FIG. 5A illustrates interrupt ID register mapping.

FIG. 5A illustrates the interrupt ID register (IIR) mapping of the circuit shown in FIG. 1. Again, on the left is the host interface data bus 54/56 and on the right is the UART map of the I/O data effected by the UART emulator 26. In addition, the UART emulator block 26 is shown as divided into two parts 26A and 26B, along with the receive FIFO activity timeout circuit 42. The interrupt signals which have been described above as applied over the bus 45 are shown as inputs on the right hand side of FIG. 5A, as applied to an interrupt ID encoder and also effecting NOR gating of all of the enabled interrupts. The six signals are shown as applied to selected bits of the UART map input/output data on the right hand side of FIG. 5.

Figure 5B:
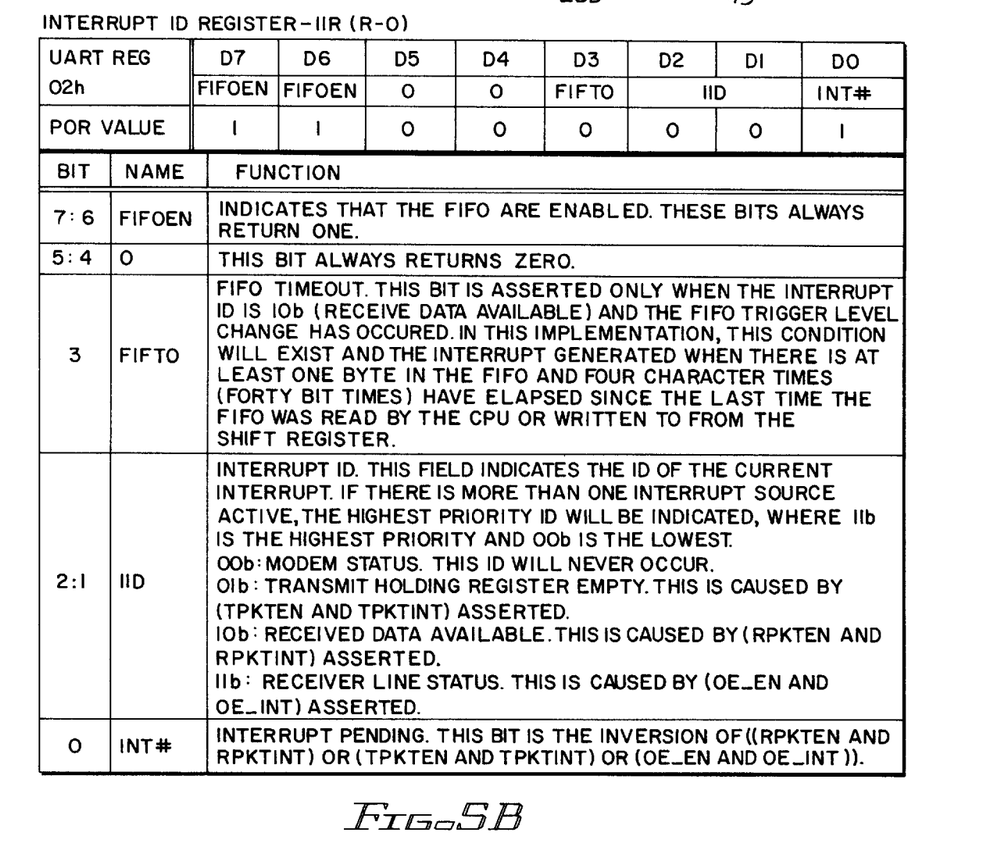
FIG. 5B is the interrupt ID register.

FIG. 5B is the interrupt ID register (IIR) illustrating the functions of the various bits. It should be noted that the I/R interrupts obtained from the circuits 26A and 26B, along with the receive FIFO activity of the timeout circuit 42, operate to provide the format compatibility for the interrupt ID register.

Figure 6A:
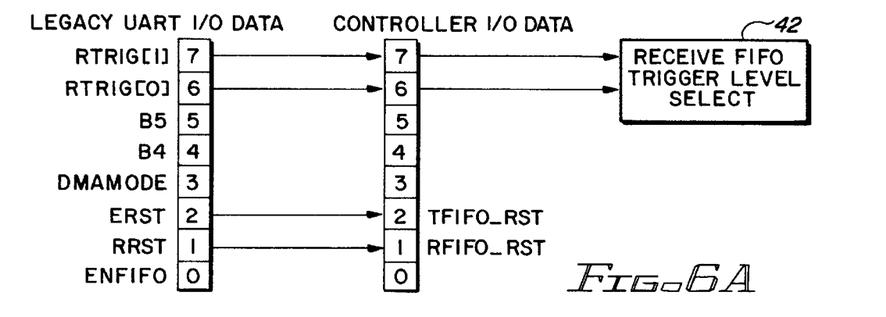
FIG. 6A shows FIFO control register mapping.
Figure 6B:
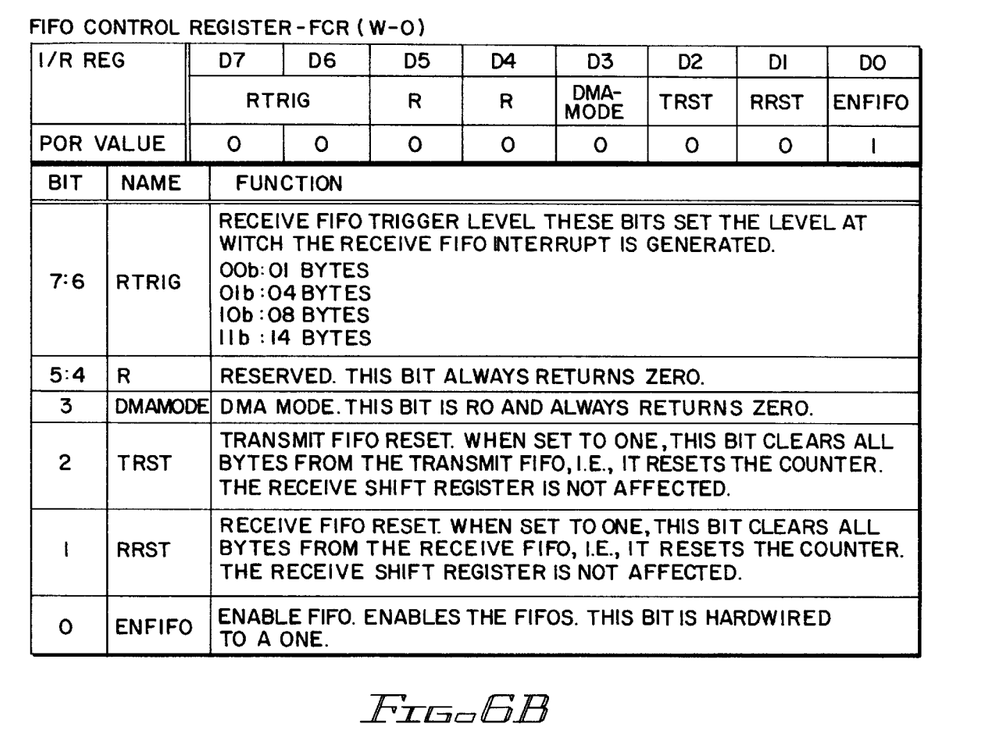
FIG. 6B is the FIFO control register.

FIG. 6A illustrates the FIFO control register (FCR) mapping. Again, the actual host interface data bus I/O data for the data bus 54/56 is shown on the left of FIG. 6A and the controller I/O data for the I/R controller 32 is shown on the right hand side of FIG. 6A. FIG. 6B shows the actual FIFO control register (FCR) indicating the status of the various bits and the function for these bits in this register.

Figure 7A:
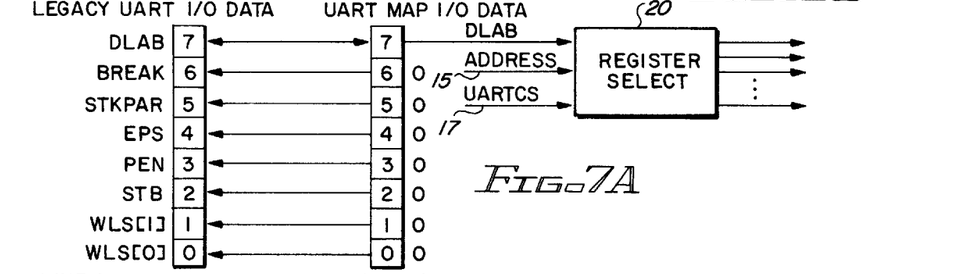
FIG. 7A shows line control register mapping.
Figure 7B:
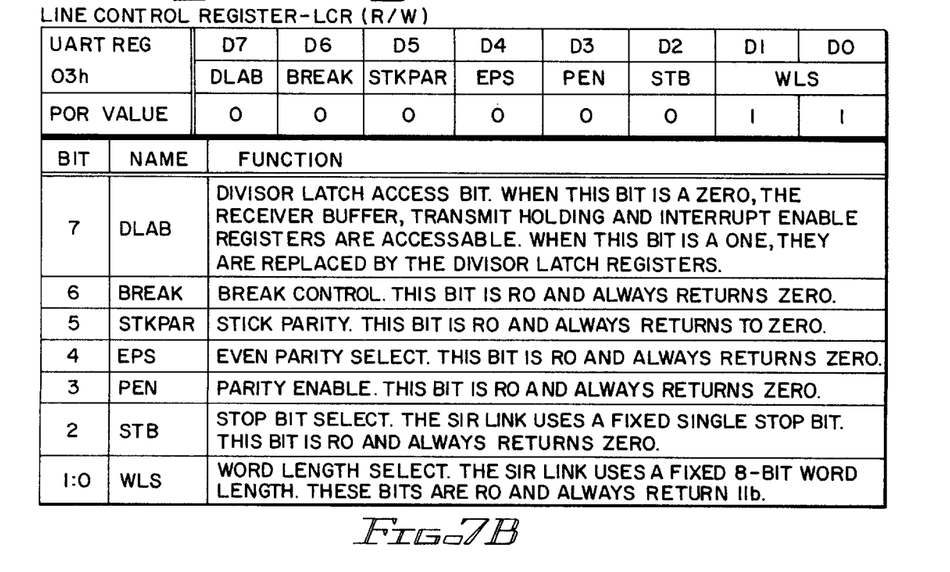
FIG. 7B is the line control register.

FIG. 7A illustrates the line control register (LCR) mapping. The same format used for FIGS. 2A, 3A, 4A, 5A and 6A is used, with the host interface data bus 54/56 shown on the left-hand side of FIG. 7A and the UART mapping of the I/O data for the UART emulator 26 shown on the right for bits 7:0. As noted in FIG. 7B, which illustrates the line control register (LCR), bit 7 is a divisor latch access bit applied from the UART emulator 26 to the register select 20. This bit enables the receiver buffer transmit holding and interrupt enable registers when it is at zero. When bit 7 is a one, these registers are replaced by the divisor latch registers DLL and DLM. FIG. 7B also explains the functions of the other bits 6:1 for this register.

Figure 8A:
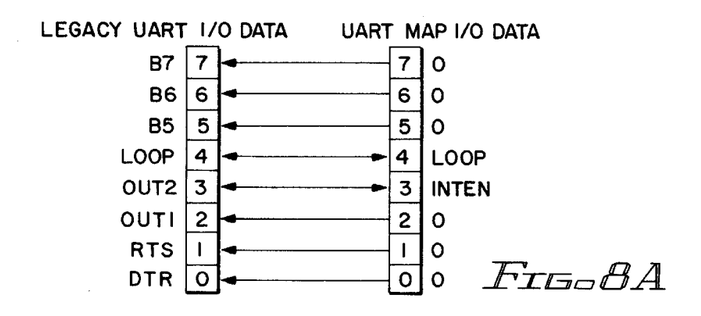
FIG. 8A shows modem control register mapping.
Figure 8B:
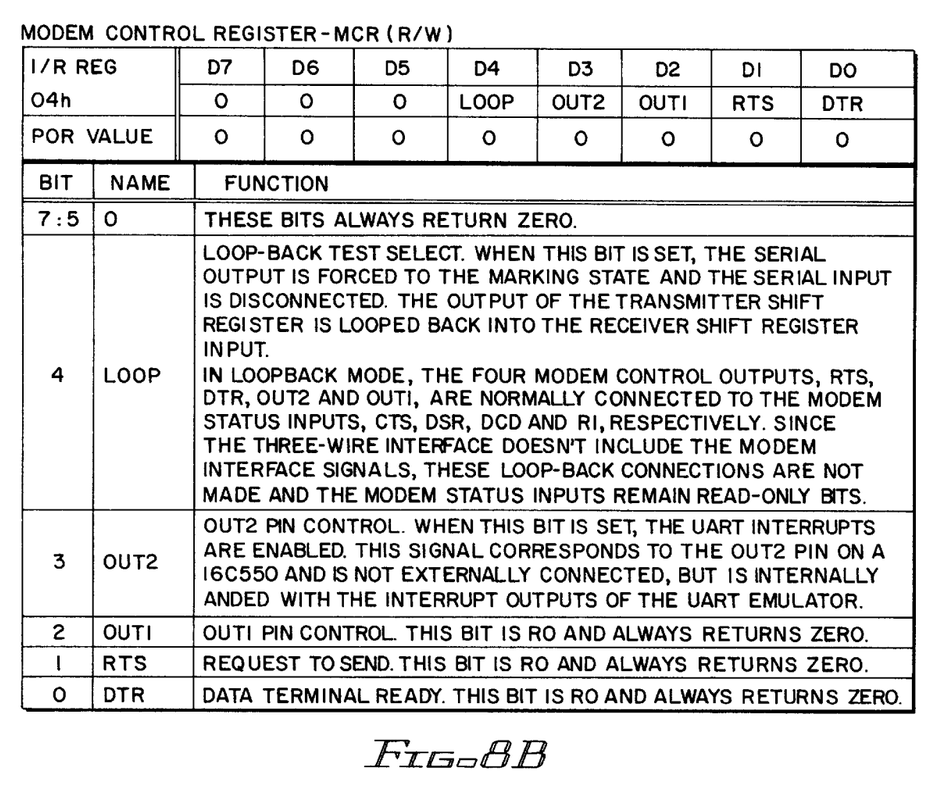
FIG. 8B is the modem control register.

FIG. 8A illustrates the modem control register (MCR) mapping, again, with the host interface data bus 54/46 bits shown on the left-hand side of FIG. 8A and the UART mapping of the input/output data for the UART emulator 26 shown on the right. FIG. 8B illustrates the modem control register (MCR) with the functions of the various bits indicated in this figure.

Figure 9A:
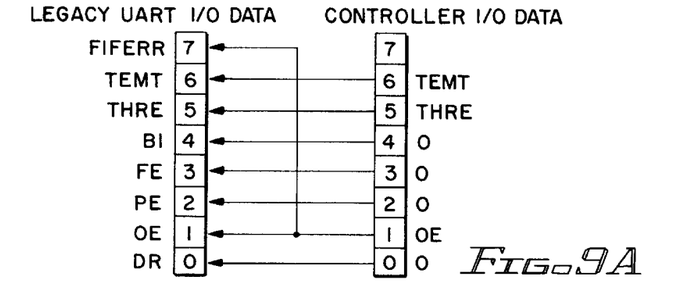
FIG. 9A shows line status register mapping.
Figure 9B:
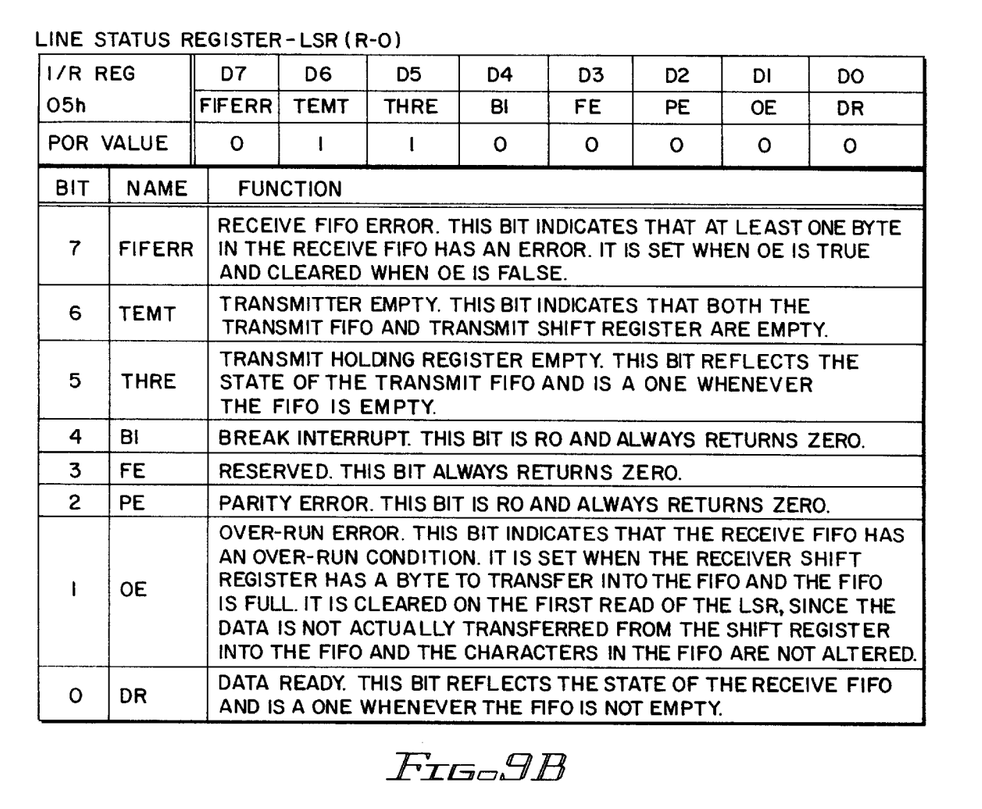
FIG. 9B shows the line status register.

FIG. 9A illustrates the line status register (LSR), again, with the host interface data bus 54/56 on the left and the I/R controller I/O data for the I/R controller 30/32 shown or the right-hand side. FIG. 9B shows the line status register (LSR) and identifies the functions of the various bits in this register.

Figure 10A:
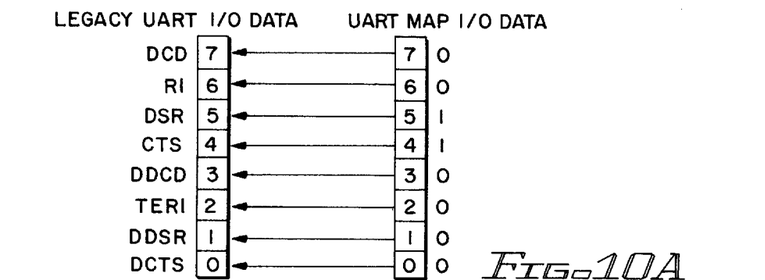
FIG. 10A shows modem status register mapping.
Figure 10B:
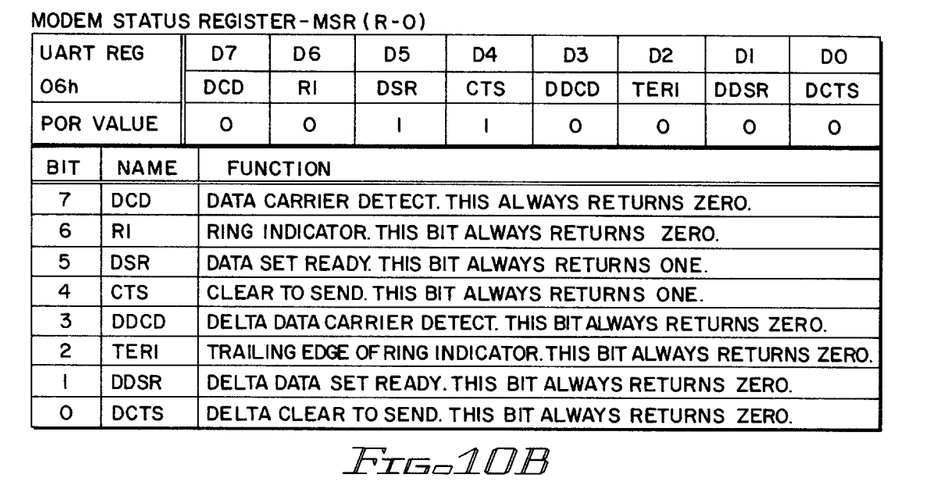
FIG. 10B is the modem status register.

FIG. 10A shows the modem status register (MSR) mapping, again, with the host interface data bus 54/56 on the left and the UART mapping of the I/O by the UART emulator 26 shown on the right. FIG. 10B shows the modem status register and the function of bits 7:10 of that register.

Figure 11A:
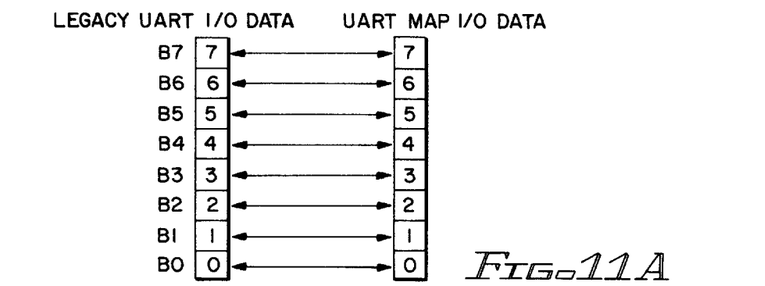
FIG. 11A shows the scratch pad register mapping.
Figure 11B:
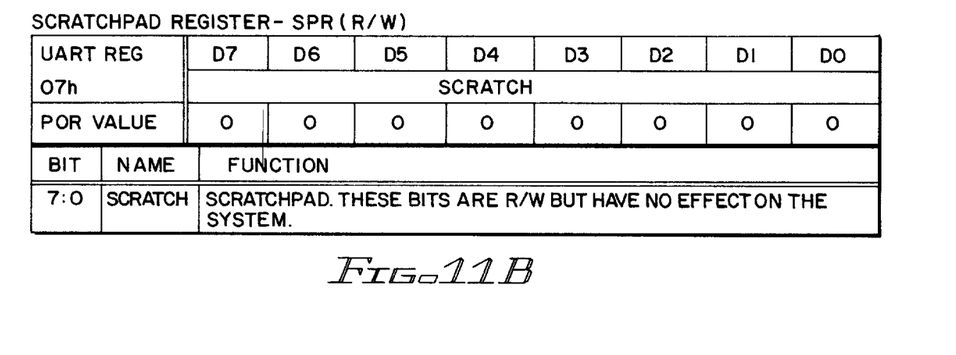
FIG. 11B is the scratch pad register.

FIG. 11A shows the scratch pad register (SPR) mapping, while FIG. 11B is the scratch pad register. The scratch pad bits are read/write bits but have no effect on the system. As a consequence, they are not supplied to either the UART emulator 26 or the I/R controller mapping 22 of the circuit of FIG. 1. These bits, however, have been shown in FIG. 11A and 11B, since they are used in the overall system with which the circuit of FIG. 1 is employed.

Figure 12A:
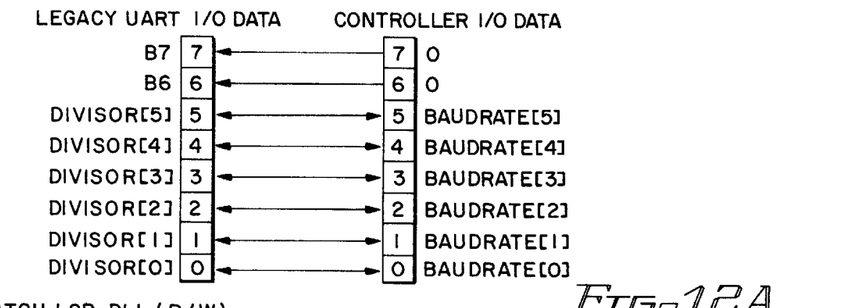
FIG. 12A shows divisor latch LSB register mapping.
Figure 12B:
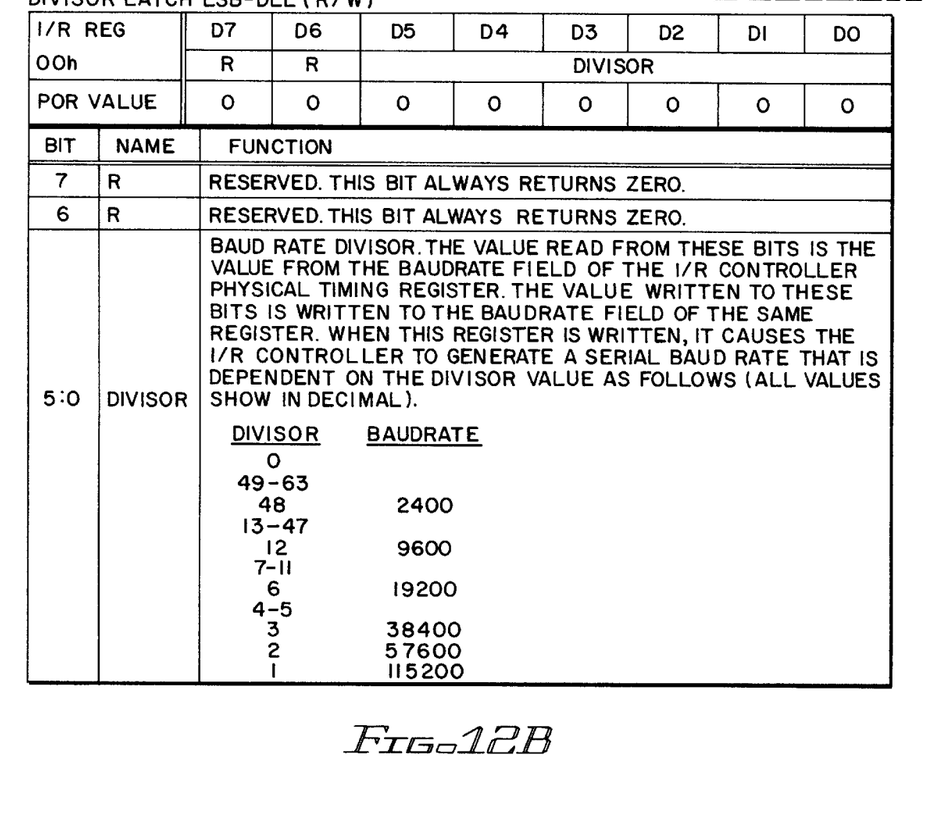
FIG. 12B is the divisor latch LSB register.

FIG. 12A shows the divisor latch least significant bit register (DLL) mapping with the host interface data bus 54/56 on the left and the controller I/O data for the I/R controller 30/32 shown on the right. FIG. 12B shows the divisor latch register itself, with the functions of the various bits indicated. It should be noted that this function is under the control of the DLAB signal from the UART emulator 26 to the register select circuit 20, as described previously.

Figure 13A:
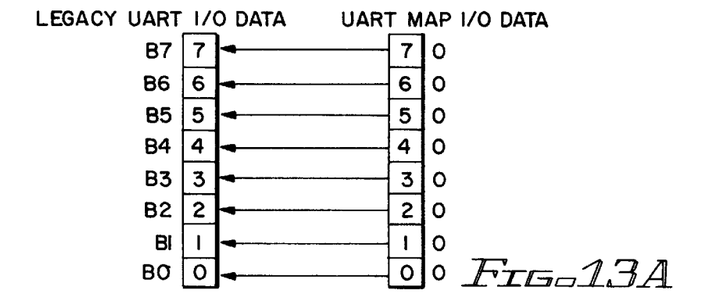
FIG. 13A shows the divisor latch MSB register mapping.
Figure 13B:
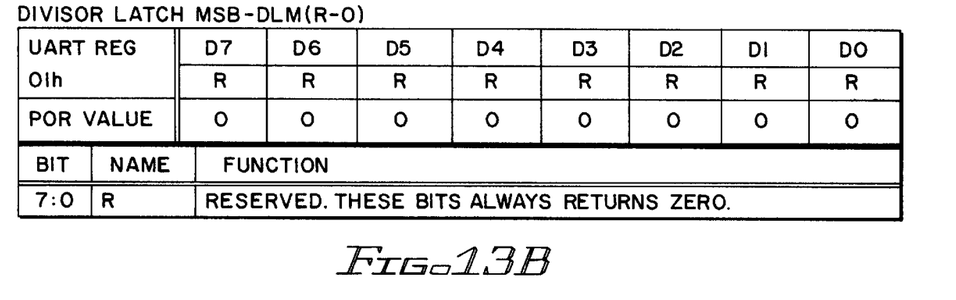
FIG. 13B is the divisor latch MSB register.

FIG. 13A shows the divisor latch most significant bit register (DLM) mapping, with the host interface data bus 54/56 on the left and the UART mapping of the I/O data for the UART emulator 26 on the right. FIG. 13B is a representation of the divisor latch most significant bit register (DLM) showing the function of the bits in this mode of operation. As explained previously, this function also is under control of the the DLAB signal.

From the foregoing it can be seen that the system automatically maps the address signals applied to the register select circuit 20 to either the UART emulator 26 or the I/R controller mapping circuit 22. The circuit 22 in turn effects operation of the I/R controller and I/R controller registers 30/32 in an automatic manner. The system interfaces, interconnected as shown in FIG. 1, allow direct addressing of the system by any CPU, irrespective of the CPU being used.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A universal asynchronous receiver/transmitter (UART) computer programming interface emulating three-wire interface control including in combination:

a register select circuit responsive to address signals from a host CPU and having a plurality of register outputs organized into first and second groups of outputs;

an infrared input/output (IR I/O) controller register set in an IR I/O peripheral controller connected to said first group of outputs of said register select circuit to receive signals directly therefrom, said controller register set further having a data output;

a UART emulator circuit connected to said second group of outputs of said register select circuit to receive signals directly therefrom, said UART emulator circuit having a data output;

a divisor latch access control coupled between said UART emulator circuit and said register select circuit for enabling said register select circuit in a first condition of operation and for switching said register select circuit to divisor latch registers in a second condition of operation; and a data bus coupled with said data outputs of said IR I/O controller register set and said UART emulator circuit.

2. The combination according to claim 1 further including interrupt outputs from said IR I/O controller register coupled with said UART emulator circuit for synchronizing operation of said UART emulator with said IR I/O controller register set.

3. The combination according to claim 1 wherein said data bus comprises a host interface internal data bus.

4. The combination according to claim 1 further including a transmit time-out circuit in said IR I/O controller register set selected to provide a predetermined time-out period; and a receive time-out circuit in said UART emulator circuit having a predetermined time-out duration following cessation of received data.

5. The combination according to claim 1 wherein said IR I/O controller register set further has a serial transmit and receive link.

6. The combination according to claim 2 further including a transmit time-out circuit in said IR I/O controller register set selected to provide a predetermined time-out period; and a receive time-out circuit in said UART emulator circuit having a predetermined time-out duration following cessation of received data.

7. The combination according to claim 6 wherein said data bus comprises a host interface internal data bus.

8. The combination according to claim 7 wherein said IR T/O controller register set further has a serial transmit and receive link.

9. The combination according to claim 3 wherein said IR I/O controller register set further has a serial transmit and receive link.

* * * * *